Aug. 14, 1951  L. E. RAUSENBERGER  2,564,232
FILLER CAP ASSEMBLY
Filed April 3, 1946
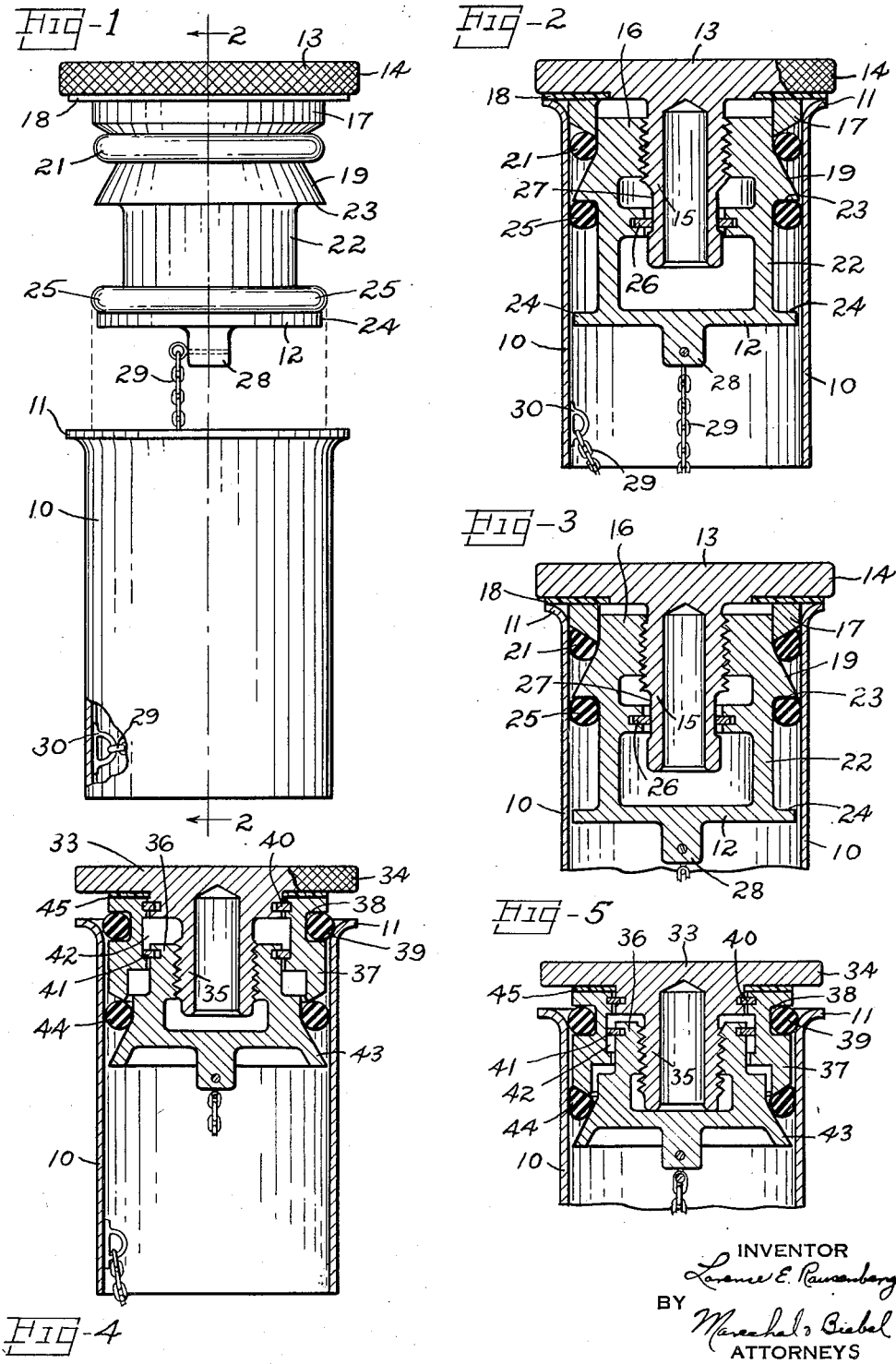

UNITED STATES PATENT OFFICE 2,564,232

FILLER CAP ASSEMBLY

Larence E. Rausenberger, Springfield, Ohio, assignor to The Steel Products Engineering Company, Springfield, Ohio, a corporation of Ohio Application April 3, 1946, Serial No. 659,325

3 Claims. (Cl. 220—24.5)

This invention relates to closures and more particularly to filler cap closure assemblies.

It is the principal object of the invention to provide a filler cap assembly adapted for closing fuel tank openings and the like, which is quick acting in operation, provides a positive seal against leakage, will withstand relatively high pressures from within the tank, and will not become loosened by shock or vibration.

It is a further object of the invention to provide such an assembly which is especially valuable for use on aircraft because of its light weight, compactness, and ruggedness and simplicity in construction and operation.

It is a further object of the invention to provide such an assembly which can be quickly clamped in the closed position and then easily opened without having to be threaded into place or requiring the use of wrenches or keys.

It is a further object of the invention to provide such an assembly which is easily opened even under icing conditions.

Other objects and advantages will be apparent from the following description, the accompanying drawings, and the appended claims.

In the drawings,

Fig. 1 is a view in perspective of a filler cap assembly constructed in accordance with the present invention with closure member shown in the unclamped position and withdrawn from the cylindrical member normally positioned in a fuel tank to define the filling opening;

Fig. 2 is a sectional view taken generally on a line 2—2 of Fig. 1 but showing the closure in position in the cylindrical member ready to be clamped to secure it in place;

Fig. 3 is a sectional view corresponding to Fig. 2 showing the closure after it has been clamped in place;

Fig. 4 is a sectional view of a modified form of filler cap assembly showing the closure in position in the cylindrical member but in the unclamped position; and Fig. 5 is a sectional view corresponding to Fig. 4 showing the closure in the clamped position.

Particularly in the case of aircraft fuel tanks, it is desirable to provide a closure which can be quickly and easily received in the filling opening to close and seal the opening, and which can be quickly and easily removed from the opening when the tank is to be filled. When in position to close the filling opening the closure should be capable of being locked or clamped in position so that it will not become dislodged by shock, vibration, or changes in pressure between the inside and outside of the tank. The closure should provide a positive seal against leakage of the contents of the tank or ingress of moisture into the tank and should be capable of withstanding relatively high pressures from within the tank. The closure should also be capable of being readily removed from the filling opening even under adverse conditions such as when ice has formed over its outer surface. It is desirable that the closure be simple and rugged in construction so that it will not get out of order and, for use on aircraft especially, it should be compact and light in weight. The closure should not require the use of wrenches, keys, or other tools for opening and closing. Not only is there danger of losing or mislaying such keys or tools, but the use of separate metallic articles in conjunction with supplying the highly volatile fuels used in aircraft engines is an element of danger in itself, due to the possibility of sparks being caused which might cause fires or explosions.

In accordance with the present invention a filler cap assembly is provided which incorporates these desirable features in a relatively simple construction. A closure is provided which is seated in the filling opening of a fuel tank without the necessity of engaging threads or the like, and is clamped securely in place by twisting a flanged portion of the closure. This rotation of the flanged portion causes an annular member carried by the closure to be expanded against the inside of the filling opening, forming a leak-resistant seal and holding the closure securely in place until the flanged portion is rotated in the opposite direction. The closure is easily removed by rotating the flanged portion to release the expanded annular member.

The annular member and annular sealing rings provided are preferably of gasoline resistant synthetic rubber which does not deteriorate rapidly and which resists vibration and wear and forms a tight seal. These annular members are the parts most likely to become worn out in normal use and are arranged so that replacement is easy. Under icing conditions these annular members have enough resiliency so that any ice can be broken loose by a sudden tap on the top of the closure with the palm of the hand. The remainder of the closure is compact, is simple and rugged in construction and operation, and is suitable to be made of a lightweight aluminum alloy.

Referring to the drawings which disclose preferred embodiments of the invention, the filling opening is defined by a generally cylindrical member 10 provided with a belled mouth 11 at the upper end thereof through which the hose or other connection to the filling supply may be received. This cylindrical member is secured in position to discharge into the fuel tank, of an aircraft or the like, by welding or other suitable means. The internal surface of the cylindrical member should be smooth.

A closure 12 which is symmetrical about its longitudinal axis is adapted to be received within the cylindrical member and close it with a leak-resisting seal. As shown in Figs. 1, 2 and 3, the closure has a cap member 13 provided with a flange portion 14 which is adapted to be gripped and may be knurled to make a better grip possible. The cap member has a central stem or equivalent portion 15 which is provided with male threads extending part of the distance from the flange portion to the end of the stem and adapted to be screwed into a central tapped (threaded) portion in the main body member 16 of the closure. The body member 16 is reduced in diameter at the portion surrounding the tapped end to form a seat for a retainer sleeve 17. The sleeve 17 is loose on the body member 16 and is held in position by the flange portion 14 of the cap member 13. The sleeve 17 is adapted for longitudinal movement on the body member 16, being advanced along the body member by the flange portion 14 when the cap member 13 is screwed into the body member. A gasket 18 is provided between the retainer sleeve 17 and the cap member 13 to facilitate relative movement of the two parts. The gasket 18 also extends outwardly sufficiently far to form a seal between the cap member 13 and the belled mouth 11 of the cylindrical member 10. This seal is designed to prevent ingress of moisture.

The body member 16 is provided with a frusto-conical portion 19 which defines a generally V-shaped annular groove with the retainer sleeve 17. An elastically deformable annular member 21 fits snugly into this V-shape groove. As shown it is round in cross-section, but it may also have a triangular or other suitable cross-section. This annular member 21 is suitably made of a gasoline resistant elastomer, such as a suitable synthetic rubber, or other durable material which can be deformed and expanded to a larger diameter by internal pressure and will return to its original diameter when the internal pressure is removed. The outside diameter of the annular member 21 should be approximately the same as the inside diameter of the cylindrical member 10 when in the unexpanded position shown in Fig. 2.

There is also provided on the body member 16 an annular groove defined by a reduced portion 22 and shoulders 23 and 24 of body member 16. The axial length of the groove between shoulders 23 and 24 is, preferably, approximately equal to the distance from the gasket 18 to the nearer shoulder 23, and the depth of the groove is substantially less than the axial length. An elastically deformable ring 25, which may be of the same material as the annular member 21, is supported in the groove. It should fit tightly on the reduced portion 22 of the body member 16, should have a circular cross-section, and the normal outside diameter when the ring is in position in the groove should be slightly greater than the inside diameter of the cylindrical member 10. With this arrangement the ring 25 will roll between the inside of the cylindrical member 10 and the reduced portion 22 when the closure 12 is inserted into the cylindrical member, forming a rolling leak-resisting seal between the closure and the cylindrical member. As shown in Figs. 2 and 3 the axial length of the groove should be such that the ring 25 will come to rest against the upper shoulder 23 when the closure is inserted downward to the closed position in the cylindrical member.

A snap ring 26 is provided to prevent the cap member 13 from being unscrewed so far that it will become separated from the body member 16 while providing for free rotary movement of one member relative to the other. Ring 26 fits in a groove formed on the inside of the body member and is adapted to move longitudinally a limited distance in an annular recess 27 provided on the outside of the unthreaded end of the stem 15 of the cap member 13. The body member 16 is provided with a projection 28 to which a chain 29 is attached, the other end of the chain being attached by an eye 30 to the inside of the cylindrical member 10. The chain 29 is long enough to permit the closure to be removed from the cylindrical member for filling operations but prevents the closure from being dropped and injured or lost.

In operation the closure 12 is held with the cap member uppermost, in the position shown in Fig. 1, and is inserted downward into the cylindrical member 10 to the position shown in Fig. 2. The elastomeric ring 25 is compressed between the reduced portion 22 of the body member 16 and the inside of the cylindrical member 10 forming a leak-resistant seal. The gasket 18 is pressed against the belled mouth 11 of the cylindrical member 10 to prevent the entrance of moisture. The cap member 13 is then rotated by means of the flange portion 14 to screw it into the body member 16. The retainer sleeve 17 is thereby progressed in a longitudinal direction along the body member, forcing the annular member 21 to a larger diameter of the frusto-conical portion 19 of the body member and pressing it against the inside of the cylindrical member 10 to clamp the closure in place and form a leak-resistant seal between the cylindrical member 10 and the body member 16, as shown in Fig. 3.

The pressure of annular member 21 serves to clamp the closure securely in place so that it cannot be dislodged by vibration, shock or normal pressures from within the tank until the cap member 13 is rotated to unscrew it from the body member 16 and release the pressure on the annular member 21, whereupon the entire closure may be directly withdrawn as a single unitary assembly. The annular member 21 and the ring 25, being of synthetic rubber or other elastic material, may be easily replaced whenever they become worn.

In the modification shown in Figs. 4 and 5, the cap member 33 is provided with a flange portion 34 and a central threaded stem or equivalent portion 35 adapted to screw into a corresponding threaded portion in a body member 36 as in the form already described. A somewhat larger longitudinally movable retainer sleeve 37 is provided than in the previous form, so that an annular groove 38 may be provided therein. An elastomeric ring 39 is contained in groove 38, the relative dimensions being such that the ring 39 fits snugly in groove 38 and has a normally greater outside diameter than the inside diameter of the cylindrical member 10. The ring 39 is adapted to seat on the belled mouth 11 of the cylindrical member 10 and form a seal to prevent ingress of moisture. A snap ring 40 fitting into grooves formed in the retainer sleeve 37 and the cap member 33 prevents these two members from moving apart, while providing for free rotary movement of the cap member relative to the retainer sleeve. A snap ring 41 fitting into a groove formed in the body member 36 and in an annular recess 42 provided on the inside of the retainer sleeve 37 prevents the body member from being unscrewed so far that it will become separated from the cap member 33 and the retainer sleeve 37. The body member 36 is provided with a frusto-conical portion 43 with which the retainer sleeve 37 defines an annular groove adapted to receive an annular member 44. The annular member 44 is similar in construction to the previously described annular member 21, and performs a similar function. A gasket 45 is provided between the retainer sleeve 37 and the cap member 33 to facilitate relative rotation of the two parts. Since the seal at the belled mouth 11 of the cylindrical member 10 is provided by the ring 39 and not, as in the previous modification, by the gasket, the gasket 45 need only be of the same outside diameter as the retainer sleeve 37.

In operation the closure is inserted into the cylindrical member 10 until the elastomeric ring 39 seats firmly in the belled mouth of the cylindrical member 10. The cap member 33 is rotated by the flange portion 34 to screw it into the body member 36. This forces the retainer sleeve 37 against the annular member 44, pressing the annular member 44 against the inside of the cylindrical member 10, as shown in Fig. 5, and clamping the closure securely in place with a leak-resistant seal.

In the modification shown in Figs. 4 and 5, the annular member 44 provides the only seal against leakage from within the tank whereas, in the modification shown in Figs. 1, 2 and 3, an additional seal is provided by the ring 23. Hence the modification shown in Figs. 1, 2 and 3 will withstand a higher pressure from within the tank than will the modification shown in Figs. 4 and 5. However, either modification will easily withstand any pressures developed under normal operating conditions. In both modifications a seal is provided to prevent ingress of moisture. However, if moisture should get into or around the closure and freeze, the ice can easily be broken by a sudden tap with the palm of the hand and the closure can then be removed in the usual manner by first rotating the cap member to release pressure on the annular member.

According to this invention a single unitary assembly is provided for closing fuel tanks, and the like, which is dependable, simple in construction and operation, compact, durable, and light in weight. It is suitable to be made principally of a lightweight alloy when maximum lightness is desirable. Parts which are most susceptible to wear are inexpensive to make and easily replaced. The closure is symmetrical about its longitudinal axis and is not provided with outside threads or other engaging parts; it can, therefore, be inserted into the cylindrical member forming the filling opening in any relative angular position without the necessity of aligning parts or engaging threads. The closure can be clamped in position to seal the filling opening by a small twist of the flange portion at the top of the closure. The closure can be removed quickly and easily for filling even under icing conditions after twisting the flange portion in the reverse direction.

While the forms of apparatus herein described constitute preferred embodiments of the invention it is to be understood that the invention is not limited to these precise forms of apparatus, and that changes may be made therein without departing from the scope of the invention which is defined in the appended claims.

What is claimed is:

1. A filler cap assembly of the character described comprising a generally cylindrical member defining a filling opening, a closure receivable within said cylindrical member and including a body portion and a retainer sleeve supported by said body portion and longitudinally movable thereon, a frusto-conical portion on said body portion defining with said retainer sleeve a generally V-shaped annular groove, said closure having thereon another annular groove axially spaced from said V-shaped groove, a continuous elastically deformable annular member of rubbery material carried in each of said grooves, and a cap member, said cap member having a threaded portion engaging a corresponding threaded portion of said body portion, said cap member bearing against said retainer ring and adapted to move it longitudinally on said body portion toward said frusto-conical portion when said cap member and said body portion are screwed together to reduce the size of said V-shaped groove and force said annular member therein outwardly against the inside of said cylindrical member to clamp said closure in position with a leak-resistant seal.

2. A filler cap assembly of the character described comprising a generally cylindrical member defining a filling opening, a closure receivable within said cylindrical member having a central threaded portion and a cylindrical portion, a cap member having a flange portion of greater diameter than said cylindrical member and having a central threaded stem in screw engaging relationship with said threaded portion of said closure, a retainer sleeve longitudinally movable on said cylindrical portion of said closure and positioned thereon against said flange portion of said cap member, said closure having a frusto-conical portion defining a generally V-shaped annular groove with said retainer ring, a continuous elastically deformable annular member of rubbery material fitting snugly in said groove having a normal outside diameter which is approximately the same as the inside diameter of said cylindrical member and adapted to be expanded against the inside of said cylindrical member to clamp said closure in position with a leak-resistant seal when said retainer ring is moved longitudinaly toward said frusto-conical portion to reduce the size of said annular groove by screwing said cap member and said closure together, said closure having a reduced portion defining a second annular groove of substantially greater axial length than depth, a continuous elastically deformable ring of rubbery material supported by said second annular groove having a normal outside diameter which is slightly greater than the inside diameter of said cylindrical member and adapted to form a rolling seal between said cylindrical member and said closure when said closure is inserted in said cylindrical member.

3. In a filler cap assembly of the character described, a generally cylindrical member defining a filling opening, a closure symmetrical about its longitudinal axis receivable within said cylindrical member in any relative angular position having a reduced portion defining an annular groove of substantially greater axial length than depth near one axial extremity thereof, and having a second reduced portion defining a second annular groove near the other axial extremity thereof, means for reducing the size of said second annular groove, and elastically deformable rings positioned in said grooves adapted to form leak-resistant seals between said closure and said cylindrical member, the ring position in the first of said grooves being adapted to form a rolling seal between said closure and said cylindrical member and the ring positioned in the second of said grooves being adapted to be expanded against the inside of said cylindrical member when said groove is reduced in size.

LARENCE E. RAUSENBERGER.

REFERENCES CITED

The following references are of record in the file of this patent:

UNITED STATES PATENTS

| Number | Name | Date |
|---|---|---|
| 437,289 | Clark | Sept. 30, 1890 |
| 474,196 | Streeter | May 3, 1892 |
| 595,189 | Mern | Dec. 7, 1897 |
| 700,351 | Mason | May 20, 1902 |
| 1,043,298 | Clark | Nov. 5, 1912 |
| 1,068,793 | Mason | July 29, 1913 |
| 1,903,168 | Cordrey | Mar. 28, 1933 |
| 1,949,498 | Stone et al. | Mar. 6, 1934 |
| 1,985,899 | John | Jan. 1, 1935 |
| 2,029,606 | Bredtschneider | Feb. 4, 1936 |
| 2,064,569 | Santucci | Dec. 15, 1936 |

FOREIGN PATENTS

| Number | Country | Date |
|---|---|---|
| 1,604 | Great Britain | Jan. 21, 1902 |